Patented May 17, 1927.

1,628,807

UNITED STATES PATENT OFFICE.

OVID E. ROBERTS, JR., OF WASHINGTON, DISTRICT OF COLUMBIA.

MANUFACTURE OF SHAPED ARTICLES OF SET PLASTIC MATERIAL.

No Drawing.   Application filed July 26, 1923. Serial No. 654,035.

This invention relates to manufacture of shaped articles of set plastic material; and it relates more particularly to the manufacture of hollow or solid building blocks, tile, and the like, consisting largely of set hydrated lime with which is intimately commingled and incorporated a suitable porous material of cellular or absorbent character, or both, in proper proportions, the whole constituting a shaped article of the character in question possessing good structural strength and being of great importance and utility in the art.

The present applicant has discovered that, contrary to the view generally held, conversion of calcium hydroxid to calcium carbonate in plastic mixtures by the action of the air occurs only to an unimportant and superficial extent; furthermore, that under properly controlled and regulated conditions, the lime present in mixtures containing appropriate porous fillers may be hydrated to a form that is hard, water-resistant or insoluble, and capable of conferring upon shaped articles formed therefrom structural strength and rigidity in high degree, all these properties differentiating such hydrated lime from calcium hydroxid of the usual and well known type. The conditions necessary to a realization of these desirable results are: The employment of lime in such quantity that, figured as calcium hydroxid, it constitutes in all instances upwards of one-third by weight of the mixture of lime and porous filler material, and, with certain types of fillers, at least 55 to 60 per cent; the employment, in intimate association with the lime, of porous material having the capability of absorbing or/and adsorbing moisture in such manner as to exercise a controlling and regulating effect upon the hydration of the lime into the hard resistant form sought; and the employment of heavy pressure in forming the plastic mixture of intimately commingled ingredients into the desired shape.

For the purposes of this invention, porous materials suitable for use as fillers in mixture with the lime may be considered as divided into cellular and absorbent materials. Under cellular materials it is intended to include materials such as coke, coke breeze, charcoal, pumice or other porous stone, and blast furnace slag which, though porous, are of relatively fixed or rigid cellular structure; while under the head of absorbent materials it is intended to include porous materials that are more or less compressible or yielding in character as opposed to the fixed or rigid construction characterizing coke and the like. As an example of an absorbent material suitable for use in practicing the invention may be cited corncobs, these being found to be particularly effective as filler material when properly comminuted and thoroughly incorporated with the lime. Other cellulosic materials, such as peanut shells, wheat or grain chaff, corn stalks, corn-pith, and the like, may be mentioned as further examples of cellulosic materials coming under the head of absorbent fillers suitable for the purposes of the invention. It is to be understood that, where necessary, the porous materials may be ground, crushed or otherwise reduced to relatively finely divided condition. As a general rule, sawdust is not well suited for use in the practice of the invention unless accompanied by some other absorbent of highly cellular character, such as an absorbent of the pumice type under which head may be included pumice, blast furnace or other metallurgical slag, and similar mineral cellular fillers. The difficulty encountered in attempting to use sawdust alone as a filler is that sawdust varies so widely in its characteristics and power of controlling lime hydration that its action is apt to be erratic and unreliable. The resinous character of many varieties of sawdust is also responsible for its unsatisfactory performance in many cases, the presence of resin or other water-repellent material in association with the filler having an inhibiting effect upon the hydrating action.

Without intending to restrict the scope of the invention to specific details of operation or composition, certain practical embodiments of the invention will be hereinafter described in detail in order to afford concrete illustrative examples whereby the underlying principles of the invention can be further explained and understood.

According to one way of carrying out the invention practically, ordinary pulverulent lime hydrate is intimately commixed with a suitable porous material in a pug mill or other suitable mixing device, with sufficient water to render the mixture properly plastic and workable. The porous material may be granulated blast furnace slag, for example, and may be employed in the proportion of 40 to 45 parts of slag to 60 to 55 parts of the lime hydrate, all parts being by weight. Where blast furnace slag is the only active hydration-controlling porous material used in the mix, the proportion of lime hydrate should not be less than 55 parts.

Care should be taken that the mixture be as intimate as possible. In the event that lime putty is used, this intimate commingling is especially important in order that the hydration-controlling effect of the filler may subsequently be properly exercised. After the mixing in the pug mill is completed, the plastic mass is formed into the desired shaped articles under heavy pressure. For example, it can be extruded through a die into the form of hollow blocks. Extrusion apparatus suitable for this purpose is in common use in the brick and hollow tile art, and the pressure incidental to the use of such apparatus is of the order of magnitude required in practicing the present invention. The precise degree of pressure characterizing the extruding operation necessarily varies somewhat with the composition and consistency of the plastic mixture, the dimensions of the dies, and other conditions; but in all cases it is sufficiently high to satisfy the requirements of the invention.

Unslaked lime (calcium oxid) may replace the calcium hydrate in part in preparing the plastic mixture; but the use of unslaked lime is ordinarily less advantageous in that when it is used, the resulting shaped articles sometimes exhibit a tendency to swell and flake, particularly when the lime is in particles of a size which precludes thorough slaking prior to extrusion. Where it is desired that the building block, hollow tile, or other shaped articles, shall be relatively light, and at the same time structurally strong, a nonresinous cellulosic material, such as comminuted corncobs, for example, can be used in place of the mineral absorbent filler specified in the foregoing concrete example. Corncobs give exceptionally good results in this connection, as do also peanut shells. A still better procedure is to employ a porous filler composed partly of a cellular material of the pumice type, such as blast furnace slag, pumice or the like, and partly of an absorbent material of a cellulosic character, such as corncobs, peanut shells, etc. This combination gives a block of very great strength which is at the same time substantially lighter than one in which the filler is composed entirely of blast furnace slag, pumice, or other material of cellular structure. When using absorbent fillers, and especially when using mixtures of absorbent and cellular materials such, for example, as the combination of blast furnace slag and corncobs above mentioned, the proportion of lime hydrate used in preparing the mix may be materially less than in the case where blast furnace slag is the only porous agent used. But in any case, the lime hydrate should most desirably constitute at least one-third by weigth of the mixture with the porous agent, 40 to 60 per cent being the best practice.

The blocks after coming from the extruding press are allowed to set, free access of air to the blocks favoring rapid setting. The time of setting varies somewhat depending upon the composition of the mix, but in no case is artificial heat required to bring about proper set within a reasonable time.

While the precise mechanism of the setting operation is not fully known at this time, it it believed that when calcium hydrate is intimately mixed with an absorbent material or one of cellular structure, as described, and the mass subjected to the pressure of an order of magnitude comparable to the pressure incident to extrusion through a die as practiced in the manufacture of ordinary hollow tile, the calcium-hydrate-water mixture stabilizes either by forming a lower hydrate or by taking up a considerable amount of water as water of crystallization. This stabilization is assisted, regulated and controlled by the presence of the absorbent or cellular material which removes any excess of water either temporarily or permanently, allowing any permanently removed excess to evaporate into the air later. Whether or not this is the correct explanation of what takes place, the invention is based upon the results obtained in actual operation and it is not to be understood as limited by any theory of the physical or chemical reactions that may occur. The product is a hard block, comparatively cheap and easy to manufacture, and is capable of withstanding all pressures and strains to which building block, hollow tile, and the like, are commonly subjected in practice. The product is primarily a block of hydrated lime, any calcium carbonate present being practically all due to what may have been initially contained in the lime hydrate used in making up the mix. Ordinary air-slaked lime may contain up to 5 per cent or so of carbonate.

What is claimed is:

1. As a new articles of manufacture, a building block or the like, structurally strong and consisting of a set water-resistant composition comprising hydrated lime and non-resinous porous filler material intimately commingled and incorporated therewith, said hydrated lime being in the form of a stabilized calcium-hydrate-water mixture and constituting more than one-half of the composition.

2. As a new article of manufacture, a building block or the like, structurally strong and consisting of a set water-resistant composition comprising hydrated lime and non-resinous porous filler material intimately commingled and incorporated therewith, said hydrated lime being in the form of a stabilized calcium-hydrate-water mixture and constituting between one-half and two-thirds of the composition.

3. As a new article of manufacture, a building block or the like, structurally strong and consisting of a set water-resistant composition comprising hydrated lime and cellular filler material intimately commingled and incorporated therewith, said hydrated lime being in the form of a stabilized calcium-hydrate-water mixture and constituting between one-half and two-thirds of the composition.

4. As a new article of manufacture, a building block or the like, structurally strong and consisting of a set water-resistant composition comprising hydrated lime and filler material of the pumice type intimately commingled and incorporated therewith, said hydrated lime being in the form of a stabilized calcium-hydrate-water mixture and constituting between one-half and two-thirds of the composition.

5. As a new article of manufacture, a building block or the like, structurally strong and consisting of a set water-resistant composition comprising hydrated lime and non-resinous absorbent filler material intimately commingled and incorporated therewith, said hydrated lime being in the form of a stabilized calcium-hydrate-water mixture and constituting between one-third and two-thirds of the composition.

6. As a new article of manufacture, a building block or the like, structurally strong and consisting of a set water-resistant composition comprising stabilized hydrated lime and comminuted corncobs intimately commingled and incorporated therewith.

7. As a new article of manufacture, a building block or the like, structurally strong and consisting of a set water-resistant composition comprising stabilized hydrated lime and cellular and absorbent filler material intimately commingled and incorporated therewith.

8. As a new article of manufacture, a building block or the like, structurally strong and consisting of a set water-resistant composition comprising stabilized hydrated lime and a cellular and absorbent filler material intimately commingled and incorporated therewith, said hydrated lime constituting upwards of one-third of the composition.

9. As a new article of manufacture, a building block or the like, structurally strong and consisting of a set water-resistant composition comprising stabilized hydrated lime and cellular and absorbent filler material intimately commingled and incorporated therewith, said hydrated lime constituting approximately 40 to 60 per cent of the composition.

10. As a new article of manufacture, a building block or the like, structurally strong and consisting of a set water-resistant composition comprising stabilized hydrated lime and filler material comprising comminuted metallurgical slag and corncobs intimately commingled and incorporated therewith.

11. As a new article of manufacture, a building block or the like, structurally strong and consisting of a set water-resistant composition comprising hydrated lime and filler material comprising comminuted metallurgical slag and corncobs intimately commingled and incorporated therewith, said hydrated lime constituting from one-third to two-thirds of the composition.

12. The process of manufacturing shaped articles of set plastic material which comprises intimately commingling lime and non-resinous porous filler material having the power to control and regulate hydration of the lime, in the presence of sufficient water to render the mixture plastic, and the lime, figured as calcium hydroxid, constituting more than one-half of the solids in the mixture, forming said mixture into the desired shaped article with the aid of heavy pressure sufficiently great to enable extruding said mixture through a die and allowing said article to set.

13. The process of manufacturing shaped articles of set plastic material which comprises intimately commingling lime and filler material comprising both absorbent material and material of the pumice type, in the presence of sufficient water to render the mixture plastic, and the lime, figured as calcium hydroxid, constituting between one-third and two-thirds of the solids in the mixture, forming said mixture into the desired shaped article with the aid of heavy pressure sufficiently great to enable extruding said mixture through a die and allowing said article to set.

14. The process of manufacturing shaped articles of set plastic material which comprises intimately commingling lime and non-resinous cellulosic porous material, in the presence of sufficient water to render the mixture plastic, and the lime, figured as calcium hydroxid, constituting upwards of one-third of the solids in the mixture, forming said mixture into the desired shaped article with the aid of heavy pressure sufficiently great to enable extruding said mixture through a die and allowing said article to set.

15. The process of manufacturing shaped articles of set plastic material which comprises intimately commingling lime and highly porous filler material comprising both mineral and cellulosic constituents, in the presence of sufficient water to render the mixture plastic, and the lime, figured as calcium hydroxid, constituting between one-third and two-thirds of the solids in the mixture, forming said mixture into the desired shaped article with the aid of heavy pressure sufficiently great to enable extruding said mixture through a die and allowing said article to set.

16. The process of manufacturing shaped articles of set plastic material which comprises intimately commingling lime and comminuted corncobs, in the presence of sufficient water to render the mixture plastic, and the lime, figured as calcium hydroxid, constituting upwards of one-third of the solids in the mixture, forming said mixture into the desired shaped article with the aid of heavy pressure sufficiently great to enable extruding said mixture through a die and allowing said article to set.

17. The process of manufacturing shaped articles of set plastic material which comprises intimately commingling lime and porous filler material comprising comminuted metallurgical slag and corncobs, in the presence of sufficient water to render the mixture plastic, the lime, figured as calcium hydroxid, constituting upwards of one-third of the solids in the mixture, forming said mixture into the desired shaped article with the aid of heavy pressure, and allowing said article to set.

In testimony whereof I hereunto affix my signature.

OVID E. ROBERTS, Jr.